C. E. BALLARD.
COW WEANER.
APPLICATION FILED JULY 31, 1908.
934,651.
Patented Sept. 21, 1909.
2 SHEETS—SHEET 1.
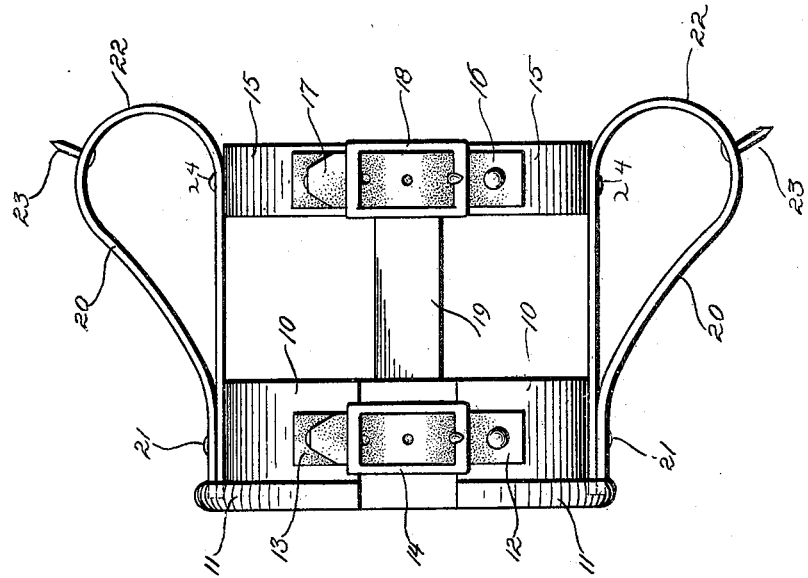
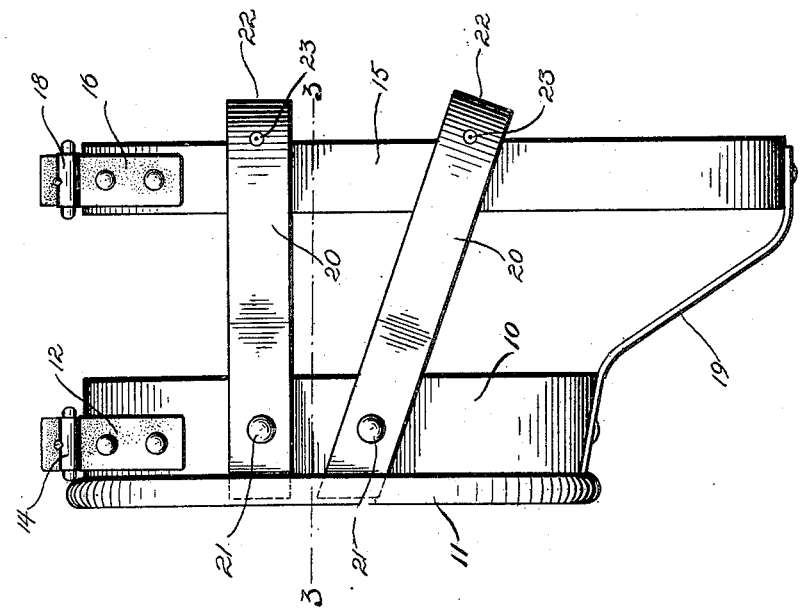
Witnesses
C. E. Chandlee
Will. H. Chandlee
Inventor
Charles E. Ballard.
By Chandlee & Chandlee
Attorneys

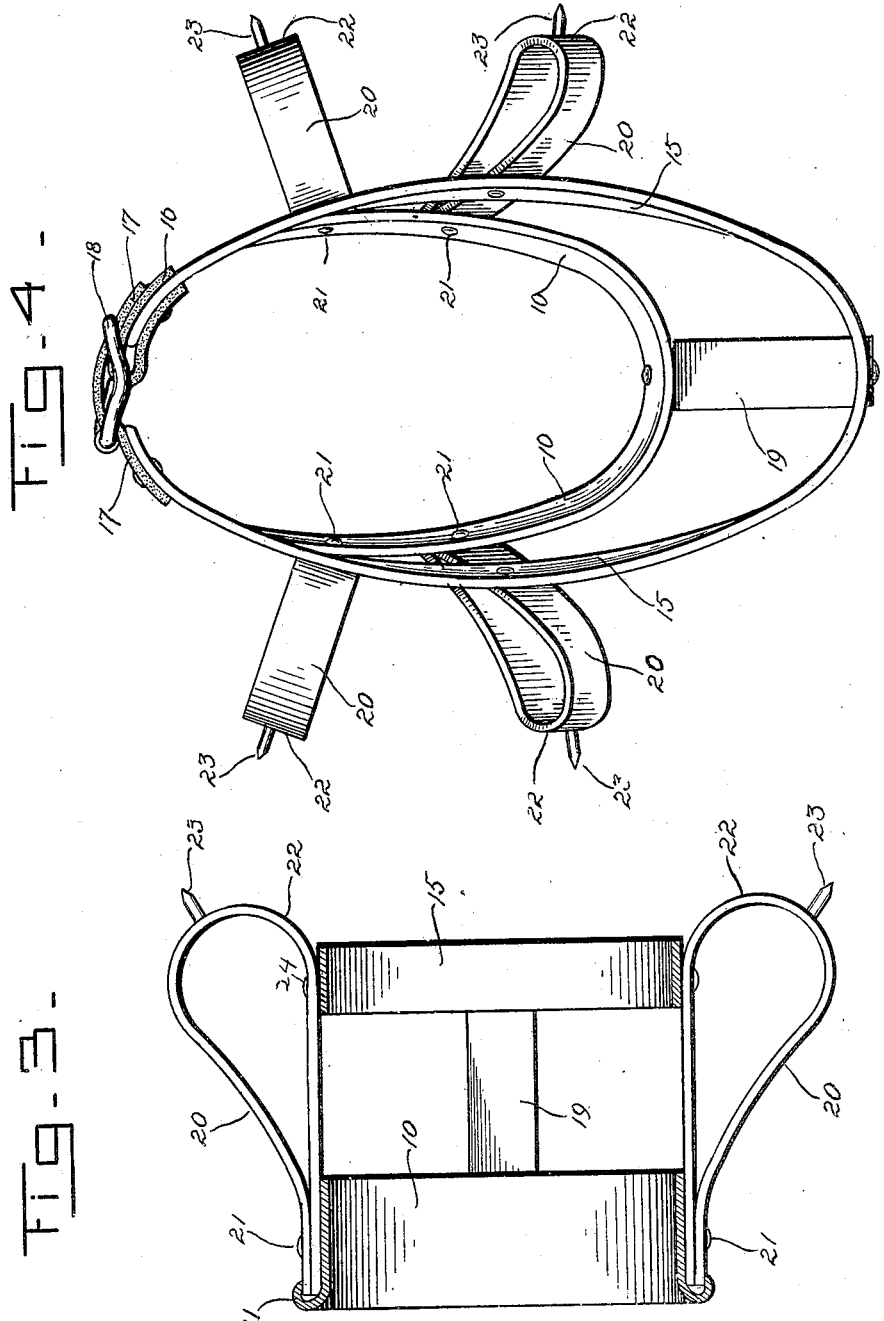

UNITED STATES PATENT OFFICE.

CHARLES E. BALLARD, OF GUTHRIE CENTER, IOWA.

COW-WEANER.

934,651.

Specification of Letters Patent.   Patented Sept. 21, 1909.

Application filed July 31, 1908.   Serial No. 446,322.

*To all whom it may concern:*

Be it known that I, CHARLES E. BALLARD, a citizen of the United States, residing at Guthrie Center, in the county of Guthrie, State of Iowa, have invented certain new and useful Improvements in Cow-Weaners; and I do hereby declare the following to be a full, clear, and exact description of the invention, such as will enable others skilled in the art to which it appertains to make and use the same.

This invention relates to devices employed for preventing cows from nursing themselves, and has for one of its objects to simplify and improve the construction and increase the efficiency and utility of devices of this character.

Another object of the invention is to provide a simply constructed device of this character which may be readily adapted to the neck of the cow, and which will not irritate or annoy the animal.

With these and other objects in view the invention consists in two divided bands spaced apart and engaging around the neck of the animal, one close behind the ears, and the other nearer the shoulder, and each band having means for adjusting it on the animal, spaced connecting bars between the bands, the bars at the sides bent upon themselves and curving outwardly to increase the width and provided with spurs, so that the spurs are spaced sufficiently far from the body of the animal to avoid contact therewith under normal conditions but which will press into the sides if the animal attempts to nurse herself, and thus cause her to withdraw her head.

The invention further consists in certain novel features of construction as hereafter shown and described, and then specifically pointed out in the claims, and in the drawings illustrating the preferred embodiment of the invention, Figure 1 is a side elevation of the improved device. Fig. 2 is a plan view of the same. Fig. 3 is a section on the line 3—3 of Fig. 1. Fig. 4 is a rear elevation of the improved device.

The improved device comprises a divided band 10 of metal conforming substantially to the neck of a cow just back of the ears and preferably formed with a rib 11 to stiffen and strengthen the band and at the same time form a guard to the neck and prevent abrasion thereof. The terminals of the band are connected by straps 12—13 and a buckle 14 so that the band may be adapted to the neck of the animal and secured thereon.

Rearwardly of the band 10 is another divided band 15 adapted to pass around the neck of the animal nearer the shoulders and likewise provided with straps 16—17 and a buckle 18 to enable the band to be adapted to and secured upon the neck.

Connecting the lower portions of the bands is a strap 19 curving downwardly and conforming substantially to the form of the throat of the animal between the two bands.

Connecting the bands 10—15 near their central portions at each side are straps 20 formed by bending the same centrally upon themselves and connecting the terminals by a single rivet 21 to the forward band 10 and forming the bends of the straps into relatively large loops 22, the loops projecting outwardly from the rear portion of the device or opposite the rear band 15. The straps 20 are also connected to the band 15 by rivets 24. Each of the connecting straps 21 is provided with an outwardly projecting spur 23.

When the improved device is placed upon the neck of an animal as before described the loops 22 projecting laterally opposite the neck portion of the animal hold the spurs 23 at a sufficient distance from the body to prevent contact therewith so long as the head of the animal is retained in normal position, but any attempt to turn the head to a sufficient extent to enable the animal to reach the udder will cause the spurs 23 to prick into the sides and cause the animal to instantly restore the head to its normal position, and thus effectually prevent the animal from nursing itself.

The improved device is simple in construction, can be inexpensively manufactured from band metal, preferably steel, and will be galvanized or otherwise protected to prevent corrosion.

The device may be manufactured in varying sizes, but by reason of the adjustment through the medium of the straps the device can be adapted to several sizes of animals.

The improved device can be formed to fit the neck comfortably and will not therefore cause annoyance or injury to the animal.

What is claimed is:—

1. A device of the class described comprising a forward divided band for encircling the neck of an animal near the ears, a rearward divided band for encircling the neck of an animal near the shoulders, a strap connecting the bands at the lower portions, adjustable means for connecting the bands at their divided points, and straps folded centrally upon themselves with the terminals rigidly connected to the forward band at opposite sides thereof, said straps curving outwardly in opposite directions at their bends, and spurs extending from the straps at the outwardly curving bent portions.

2. A device of the class described comprising divided bands spaced apart for encircling the neck of an animal, a plurality of straps spaced apart and connecting said bands, the rear portions of said straps directed outwardly in opposite directions, and spurs extending from said outwardly directed portions.

3. A device of the class described comprising a divided forward band for encircling the neck of the animal near the ears and with the forward edge thereof rolled outwardly and rearwardly, means for detachably connecting said band at its ends, a rearward divided band for encircling the neck of an animal near the shoulders, means for connecting the rearward divided band at its ends, a strap connecting said bands at the bottom and conforming to the throat of the animal, spaced straps each formed from a single piece bent centrally upon itself and connected to the bands at the sides with the straps curving outwardly in opposite directions at their bends and with the ends of the folded straps extending beneath the rolled edge of the forward band, and spurs extending in opposite directions from the extended portions of said straps.

4. A device of the class described comprising a forward divided band of resilient material for encircling the neck of the animal near the ears, a rearward divided band of resilient material for encircling the neck of the animal near the shoulders, a strap of resilient material connecting the bands at their lower portions, adjustable means for connecting the bands at their divided points, and straps of resilient material connecting the bands intermediate their ends and with laterally directed portions, and spurs projecting outwardly from said laterally directed portions.

In testimony whereof, I affix my signature, in presence of two witnesses.

CHARLES E. BALLARD.

Witnesses:
E. H. LOCKWOOD,
C. P. MCDONALD.